ns)

(12) United States Patent
Kusano

(10) Patent No.: US 8,688,178 B2
(45) Date of Patent: Apr. 1, 2014

(54) MOBILE ELECTRONIC APPARATUS

(75) Inventor: Eiichirou Kusano, Shizuoka (JP)

(73) Assignee: NEC Corporation, Tokyo (JP)

( * ) Notice: Subject to any disclaimer, the term of this patent is extended or adjusted under 35 U.S.C. 154(b) by 476 days.

(21) Appl. No.: 12/161,186

(22) PCT Filed: Jan. 22, 2007

(86) PCT No.: PCT/JP2007/050879
§ 371 (c)(1),
(2), (4) Date: Jul. 17, 2008

(87) PCT Pub. No.: WO2007/086333
PCT Pub. Date: Aug. 2, 2007

(65) Prior Publication Data
US 2010/0234073 A1     Sep. 16, 2010

(30) Foreign Application Priority Data

Jan. 30, 2006   (JP) ................................ 2006-021529

(51) Int. Cl.
*H04M 1/00*   (2006.01)
(52) U.S. Cl.
USPC ...................................................... 455/575.3
(58) Field of Classification Search
USPC .................. 455/575.3, 575.1, 575.4
See application file for complete search history.

(56) References Cited

U.S. PATENT DOCUMENTS 7,515,705 B2 *   4/2009   Segawa et al. ............ 379/428.01
2004/0198439 A1 *   10/2004   Kim et al. .................. 455/556.1

(Continued)

FOREIGN PATENT DOCUMENTS

EP   1298890 A2   4/2003
EP   1 594 295   *   9/2005   .............. H04M 1/60

(Continued)

OTHER PUBLICATIONS

International Search Report for PCT/JP2007/050879 mailed Apr. 17, 2007.

(Continued)

*Primary Examiner* — Kent Chang
*Assistant Examiner* — Scott Au
(74) *Attorney, Agent, or Firm* — Sughrue Mion, PLLC

(57) ABSTRACT

[Problems] A portable mobile apparatus where two magnetism detecting unit and a reduced number of magnets can specify in which of the following four states the housings of the apparatus are: an open state where the housings are opened, a closed state where the housings are closed, a reversed display state where the housings are closed with a display reversed to face the outside, and a 90-degree state where the display is turned 90 degrees in the reversed display state.
[Means of Solving Problems] The portable mobile apparatus has a display housing (11), an operation housing (21), a universal hinge (30) that enables both housings (11, 21) to be opened and closed at a connection end and enables the display housing (11) to rotate about an axis (B) that is normal to a display surface (11A) and about an axis (C) that is in parallel with the display surface (11A), a first magnet (12) and a second magnet (13) that are installed at the display housing (11), a first Hall IC (22) and a second Hall IC (23) that are installed at the operation housing (21) so as to correspond to the magnets (12, 13), and state determination unit (35) for determining each of the open/close states of the display housing (11) and the operation housing (21) based on detection information from the Hall ICs (22, 23).

5 Claims, 17 Drawing Sheets

(56) References Cited

U.S. PATENT DOCUMENTS

| | | | |
|---|---|---|---|
| 2004/0203532 A1* | 10/2004 | Mizuta | 455/90.3 |
| 2005/0049017 A1* | 3/2005 | Yoda | 455/575.1 |
| 2006/0135226 A1* | 6/2006 | Won et al. | 455/575.3 |
| 2006/0148540 A1* | 7/2006 | Satoh et al. | 455/575.3 |

FOREIGN PATENT DOCUMENTS

| | | |
|---|---|---|
| JP | 09166405 A | 6/1997 |
| JP | 2003174495 A | 6/2003 |
| JP | 2005151108 A | 6/2005 |
| JP | 2005159391 A | 6/2005 |
| JP | 2005198062 A | 7/2005 |
| JP | 2005295288 A | 10/2005 |
| JP | 2005303688 A | 10/2005 |
| JP | 2006191438 A | 7/2006 |
| WO | 2005122537 A1 | 12/2005 |
| WO | 2006098053 A1 | 9/2006 |

OTHER PUBLICATIONS

Supplementary European Search Report for EP 07 70 7142 completed Feb. 2, 2012.

* cited by examiner

OPEN STATE

CLOSED STATE

REVERSED DISPLAY STATE

90-DEGREE STATE

FIG. 8

| STATE | OUTPUT SIGNAL FROM FIRST HALL IC 22 | OUTPUT SIGNAL FROM SECOND HALL IC 23 |
|---|---|---|
| OPEN STATE | Hi 41 | Hi 43 |
| CLOSED STATE | Lo 42 | Lo 44 |
| REVERSED DISPLAY STATE | Lo 42 | Hi 43 |
| 90-DEGREE STATE | Hi 41 | Lo 44 |

FIG. 14

| STATE | OUTPUT SIGNAL FROM FIRST HALL IC 62 | OUTPUT SIGNAL FROM SECOND HALL IC 63 |
|---|---|---|
| OPEN STATE | Hi 43 | Hi 43 |
| CLOSED STATE | Lo 42 | Lo 44 |
| REVERSED DISPLAY STATE | Hi 43 | Lo 46 |
| 90-DEGREE STATE | Lo 44 | Hi 45 |

MOBILE ELECTRONIC APPARATUS

TECHNICAL FIELD

The present invention relates to an mobile electronic apparatus, and in particular, to a mobile electronic apparatus in a folding type capable of detecting any one of four states of a first housing including a display section and a second housing including an operation section, i.e., an open state, a closed state, a reversed display state, and a 90-degree state, by using a few magnets and Hall effect ICs, and not using a rotation angle detection circuit and the like.

BACKGROUND ART

Recently, the mobile information terminals, especially the mobile phones have become significantly common. As for the mobile phones, such as a strait type and a folding type are used, and especially the folding type of mobile phones are used widely and required largely because these can be held compactly.

The mobile phones nowadays are improved in those multiple functions, therefore they are not used only for communication, but also become to be used as the mobile information terminals including additional functions of a browser for such as an internet, a sending/receiving terminal for an e-mail, scheduling, and the like. Those contents to be displayed are varied in a wide range such as a large amount of character information, images, and the like.

Further, a mobile phone having a landscape display to be used when taking a picture and watching a television has been developed.

Therefore, a mobile phone with a simple folding function cannot respond to the demands for a multifunctional mobile phone. Accordingly, mobile phones including a biaxial structure, a triaxial structure, or an universal hinge mechanism in which a hinge section includes both an opening/closing mechanism and a rotation mechanism have been developed, and such mobile phones which are usable while keeping the first housing having a display surface to be in a plurality of states such as being rotated with respect to the second casing, as well as being opened or closed, have been used. In such a structure, a control section is provided to detect and recognize each state in many types of mobile phones.

For example, a folding type mobile phone apparatus having an opening/closing function with which the upper housing is to be opened and closed in a longitudinal direction and an opening/closing function with which the same is to be opened and closed in a short side direction, with respect to the bottom housing, and in addition, a folding function with which the mobile phone is folded with the upper housing being reversed back to front (refer to Patent Document 1, for example) has been well known.

As shown in FIG. 15, a mobile phone 100 disclosed in Patent Document 1 enables an upper housing 103 to be opened and closed with respect to a bottom housing 101 via hinge unit 102.

The hinge unit 102 is composed of a first hinge unit 121 having a first rotation shaft 104 and a second rotation shaft 105, and a second hinge unit 122 connected to the second rotation shaft 105 and having a third rotation shaft 106.

Rotations of each rotation shafts 104, 105, and 106 mentioned above are detected by a rotation angle detection unit.

FIG. 16 shows a cross-section taken along line X-X in FIG. 15. As shown in FIG. 16, a plurality of magnets 130 is attached on a surface of a flange 104a in the first rotation shaft 104. Approach of those magnets 130 is detected by a first rotation detecting unit 131 attached on a print substrate 113, so that a rotational angle of the first hinge unit 121 is detected.

In the same manner as the above, a plurality of magnets 132 is attached on an end face of the second rotation shaft 105, and approach of those magnets 132 is detected by a second rotation detecting unit 133 attached near the second rotation shaft 105, so that a rotational angle of the second hinge unit 122 is detected.

Further, a plurality of magnets is attached on an end face of the third rotation shaft 106, and approach of those magnets is detected by a third rotation detecting unit 135 attached near the third rotation shaft 106 in the second hinge unit 122, so that a rotation angle of the third rotation shaft 106 is detected.

In FIGS. 15-16, each component of conventional examples is referred with reference numerals of 100s simply for convenience of explanation, but contents are the same. However, the reference numeral for the mobile phone is being 100 as it is.

Further, a mobile communication terminal having a structure with which a display housing is slightly turned with respect to an operation housing when the terminal is in a normally open state, or with which both housings are slightly opened when the terminal is in a reversely closed state is also known (refer to Patent Document 2, for example).

A content of Patent Document 2 is shown in FIG. 17. As shown in FIG. 17, in a mobile phone 201 disclosed in Patent Document 2, a first housing 202 and a second housing 203 are connected openably and closably via hinge 209. The hinge 209 is composed of a first rotation shaft 210 and a second rotation shaft 211 orthogonal to each other. The first rotation shaft 210 can be rotated around an axis parallel to a plain surface of a display panel 205a, with respect to the second rotation shaft 211.

With respect to an open/close state, i.e., a state of the first housing 202 and the second housing 203 being relatively opened/closed, it is detected by an open/close detecting sensor composed of a magnet 221 and a Hall element 223, and a rotation state thereof is detected by a rotation/unrotation sensor composed of a magnet 222 and a Hall element 224.

The magnet 221 of the open/close detecting sensor and the Hall element 224 of the rotation detecting sensor are provided in the first housing 202. The magnet 222 of the rotation detecting sensor is provided in the rotation shaft 210 composing the hinge 209. The Hall element 224 of the rotation detecting sensor is provided in the first housing 202.

In FIG. 17, each component of the conventional example is referred with reference numerals of 200s simply for convenience of explanation, but contents are the same.

Patent Document 1: Japanese Patent Application Laid-open No. 2005-198062

Patent Document 2: Japanese Patent Application Laid-open No. 2005-303688

DISCLOSURE OF THE INVENTION

Problems to be Solved by the Invention

In the mobile phone 100 disclosed in Patent Document 1, the first hinge unit 121 is composed of the first and the second rotation shafts 104 and 105, and the second hinge unit 122 includes the third rotation shaft 106 one end of which is connected to the second rotation shaft. Inside each of hinge units 121 and 122, a plurality of magnets 130 and 132 etc. is provided to each of the rotation shafts 104, 105, and 106, and respective rotation detecting units 131, 132, and 135 are provided near there.

Therefore, a structure of the hinge unit 102 becomes complicated. Further, because the plurality of magnets 130 and the like are required to be provided to the rotation shaft 104 and the like respectively, and in addition, the rotation detecting units 131 and the like are required to be provided, a circuit construction for the rotation detecting unit 131 and the like becomes also complicated. Furthermore, three rotation shafts 104, 105, 106 and the like and the rotation detecting unit 131 and the like requires installation spaces widely, which prevents the mobile phone apparatuses from being downsized, despite the current trend for downsizing the mobile phone apparatuses.

Further, in the mobile phone 201 disclosed in Patent Document 2, the magnet 222 composing the rotation detecting sensor is provided inside of the second rotation shaft 211 composing the hinge 209. Since the mobile communication terminals tend to be downsized, each component is also required to be downsized. Thus, a rotation shaft having as small a diameter as possible is to be used.

Consequently, the magnet 222 is required to be installed at a precise position within the rotation shaft 211 with a small diameter, which is an installation work at a position where the installment is difficult. Therefore, there are such disadvantages that the installation work becomes difficult and that productivity and conservativeness is lowered.

Further, as for the magnet 222 composing the rotation detecting sensor and the Hall element 224, access and parting of the magnets 222 and the Hall element 224 is detected so as to detect rotation of the first housing 202 and the second housing 203. Accordingly, there is such a problem that a 90-degree rotation of the display panel 205 with respect to the operation panel 206 cannot be detected while both of the display panel 205 and the operation panel 206 are faced outside.

The present invention is proposed to solve the aforementioned problems, and an object thereof is to provide a mobile electronic apparatus capable of detecting a state of the housing in the mobile electronic apparatus from four states, i.e., an open state, a closed state where the housings are closed, a reversed display state where the housings are closed with a display reversed to face the outside, and a 90-degree state where the display is turned 90 degrees in the reversed display state, by using at least two magnetism detecting units and a few magnets, without a complicated rotation detection circuit.

Means for Solving the Problems

To achieve the above mentioned object, a mobile electronic apparatus according to the invention includes: a first housing including a display section; and a second housing being a counterpart of the first housing and including an operation section. This mobile electronic apparatus includes a universal hinge section connecting the first housing and the second housing at those end sections openably and closably, and enabling the first housing to be rotated around an axis vertical to the display section of the housing and an axis parallel to the display section of the housing at the connected section. The mobile electronic apparatus further includes a first magnet and a second magnet fixed on a plain section in either of the first housing or the second housing; and a first magnetism detecting unit and a second magnetism detecting unit for detecting magnetism of the magnets fixed on a plain section in either of the first housing and the second housing so as to correspond with those magnets.

Furthermore, the mobile electronic apparatus includes a state determining unit for determining an open/close state between the first and the second housings according to detection information from the first magnetism detecting unit and for determining a rotation state of the first housing according to detection information from the second magnetism detecting unit.

Therefore, according to the present invention, the first housing and the second housing are opened and closed via the universal hinge section with using the connected end section as a rotation supporting point, and the first housing is rotated around an axis vertical to the display section of the housing and an axis parallel to the display section. Then, such an open/close state and a rotation state are determined by the state determining unit.

The state determining unit can determine each of an open/close state and a rotation state of the first housing and the second housing according to the detecting information from the first magnetism detecting unit and the second magnetism detecting unit. Therefore, by using two magnetism detecting units and a few magnets, and not using a complicated rotation detecting unit, the state of housings in the mobile electronic apparatus can be determined to be any one of four states, i.e., an open state, a closed state, a reversed display state, and a 90-degree state where the display is turned 90 degrees in the reversed display state.

The first magnet and the first magnetism detecting unit mentioned above, or the second magnet and the second magnetism detecting unit mentioned above may be disposed and fixed at positions so as to be overlapped with each other respectively when the first housing and the second housing are folded relatively.

With this, the closed state where the first housing and the second housing are folded can be detected more certainly. In addition, because the magnets and the magnetism detecting units are disposed at positions so as to be overlapped with each other, the 90-degree state where the display is turned 90 degrees in the reversed display state can be detected by setting the magnets and the magnetism detecting units at prescribed positions.

Further, the first magnet and the first magnetism detecting unit aforementioned may be fixed at a center in each wide direction of the first and the second housings respectively, and the second magnet and the second magnetism detecting unit may be fixed in the first and the second housings respectively, which are at the positions near the universal hinge section and close to one side of the universal hinge section.

With this, the first magnet and the first magnetism detecting unit are only required to be provided at a center in each wide direction of the first and the second housings respectively, so that it becomes easy to confirm a position to be fixed, and an attachment work becomes easy.

Further, the second magnet and the second magnetism detecting unit are provided in the first and the second housings respectively, which are at the positions near the universal hinge section and close to one side of the universal hinge section. Thus, when the first housing is turned by 90 degrees in the reversed display state where the housings are closed with a display reversed to face the outside, the 90-degree state where the display is turned 90 degrees in the reversed display state can be obtained by turning slightly from a position where the second magnet and the second magnetism detecting unit are overlapped with each other.

Further, the mobile electronic apparatus according to the present invention includes, as described, the first housing including the display section and the second housing being a counterpart of the first housing and including the operation section. The mobile electronic apparatus further includes the universal hinge section which connects the first housing and the second housing openably and closably, and enables the first housing to be rotated around the axis vertical to the display section of the housing and the axis parallel to the display section of the housing. Furthermore, the mobile electronic apparatus includes the first, the second, and the third magnets fixed to a plain section in either of the aforementioned first or second housing, the first magnetism detecting unit fixed on a plain section in either of the first or the second housing for detecting magnetism of the first magnet or the second magnet, the second magnetism detecting unit fixed on a plain section in either of the first or the second housings for detecting magnetism of the third magnet, and the state determining unit for determining an open/close state of the first and the second housings according to a detection result of the first magnetism detecting unit and determining a rotation state of the first housing according to a detection result of the second magnetism detecting unit.

Therefore, according to the present invention, the first and the second housings are opened and closed via the universal hinge section, and the first housing is rotated around the axis vertical to the display section thereof and the axis parallel to the display section thereof. Then, such an open/close state and a rotation state are determined by the state determining unit.

The aforementioned state determining unit can determine an open/close state and a rotation state of the first and the second housings respectively according to the detection information from the first magnetism detecting unit and the detection information from the second magnetism detecting unit. Thus, the state determining unit can detects any one of four states of the housings in the mobile electronic apparatus, i.e., an open state, a closed, a reversed display state, and a 90-degree state where the display is turned 90 degrees in the reversed display state, without a complicated rotation detection circuit.

In this case, either of the above mentioned first or second magnet and the first magnetism detecting unit, as well as the third magnet and the second magnetism detecting unit, may be disposed and fixed at the positions so as to be overlapped with each other when the first housing and the second housing are folded relatively.

With this, the closed state where the first housing and the second housing are folded can be detected more certainly. In addition, because the magnets and the magnetism detecting units are disposed so as to be overlapped with each other, the 90-degree state where the display is turned 90 degrees in the reversed display state can be detected by setting the magnets and the magnetism detecting units at prescribed positions.

Further, one of the above mentioned first and second magnets may be set so that a south pole thereof is to be detected in the closed state, and the other may be set so that a north pole thereof is to be detected in the closed state. In addition, the first magnet and the second magnet may be disposed on a line along a width direction of the first housing with a prescribed interval in between them so that the first magnetism detecting unit corresponds to either one of the first magnet or the second magnet.

Accordingly, when the first magnet is set so that a north pole thereof is to be detected in the closed state and the second magnet is set so that a south pole thereof is to be detected in the closed state, for example, a first Hall IC detects the north pole of the first magnet in the closed state where the first housing and the second housing are folded, and the first Hall IC detects the north pole of the second magnet in the reversed display state. Consequently, the type of the pole detected by the first Hall IC is limited to only the north poles of the magnets, so that a monopolar detection Hall IC can be used for the first Hall IC. With this, a cost can be reduced effectively.

Furthermore, the aforementioned state determining unit is composed of a CPU into which signals detected by the first magnetism detecting unit and the second magnetism detecting unit are inputted. Then, the CPU may include a determining function which functions when prescribed detection signals are inputted from the first magnetism detecting unit and the second magnetism detecting unit, for determining which combination information is corresponded to the inputted detection signals, from the combination information being generated in advance for indicating the combination of output signals from the first detecting unit and the second detecting unit and states relevant to the output signals.

As described, according to the present invention, combinations of the first and the second housing states and relevant signals outputted from the first and the second magnetism detecting units are stored so as to be corresponded in advance. Therefore, the state determining unit can determine a state of housings easily according to received signals.

Advantageous Effect of the Invention

As described, according to the present invention, the first housing and the second housing are connected at each end section openably and closably, and the first housing is rotated around the axis vertical to the display section thereof and the axis parallel to the display section thereof at those end sections. Further, an open/close state and a rotation state are determined by the state determining unit. Therefore, unconventional and excellent mobile electronic apparatus capable of detecting any one of four states of the housings in the mobile electronic apparatus, i.e., the open state, the closed state, a reversed display state, and the 90-degree state where the display is turned 90 degrees in the reversed display state, quickly and certainly in real time by using a few units, that is, by using two magnetism detecting units and a few magnets, and not using a complicated rotation detecting unit, can be offered.

BEST MODE FOR CARRYING OUT THE INVENTION

Hereinafter, exemplary embodiments of the mobile electronic apparatus according to the present invention will be explained with reference to the drawings.

In FIGS. 1 to 2, a mobile electronic apparatus 10 according to the present invention includes a display housing 11 that is the first housing, and an operation housing 21 that is the second housing being a counterpart of the display housing 11 for inputting information.

The display housing 11 is formed in shape of a thin casing, and one of its main faces (i.e. a front face) includes a display surface 11A that is a display section having a main display. Further, the other one of its main faces which is an opposite face of the one of its main faces (i.e. a back surface) includes a sub-display (an illustration is omitted) which has a smaller display screen than the main display.

The operation housing 21 is formed in nearly the same shape as the display housing 11, and one of its main faces (i.e. a front face) includes an operation panel 21A having each of operational keys for inputting information. Further, the other one of its main faces which is an opposite face to the one of its main faces (i.e. a back surface) includes such as a digital camera composed of an imaging element, and a side face of the operation housing 21 includes a side key (an illustration is omitted) to perform a shutter operation when taking a picture with the digital camera.

Further, as shown in FIG. 2, above mentioned display housing 11 the operation housing 21 are connected at each end section via a universal hinge 30 openably and closably (that is, foldably) toward a direction of an arrow A. Further, the display housing 11 can be rotated around an axis B vertical to the display surface 11A of the display housing 11 and around an axis C parallel to the display surface 11A, according to the universal hinge 30.

According to the universal hinge 30 being a connection section and a rotation section at the same time, as described above, the display housing 11 and the operation housing 21 can be in any one of four states, i.e., an open state in which both housings 11 and 21 are open as shown in FIG. 3A, a closed state in which the display surface 11A and the operation panel 21A face inside so as to be folded and housed as shown in FIG. 3B, a reversed display state in which the display surface 11A and the operation panel 21A are closed with the display surface 11A reversed to face the outside as shown in FIG. 3C, and a 90-degree state in which the display surface 11A and the operation panel 21A are in the reversed display state and turned 90 degrees as shown in FIG. 3D.

The above described states in FIGS. 3A-3D are detected and identified by magnets and magnetism detecting units for detecting magnetism of the magnets respectively.

Namely, as shown in FIG. 1, the display housing 11 includes two magnets, i.e. a first magnet 12 and a second magnet 13, and the operation housing 21 includes a first Hall IC 22 that is the first magnetism detecting unit, and a second Hall IC 23 that is the second magnetism detecting unit.

The first magnet 12 is disposed at a center in a width direction of the display housing 11, which is at an end section of the display housing 11 and at opposite side to the position of the universal hinge 30 having the display surface 11A in between them, and fixed on, for example, an unillustrated substrate inside the display housing 11.

The second magnet 13 is disposed at a side end section in the width direction of the display housing 11 (in a left side in FIG. 1) and in between the display surface 11A and the universal hinge 30, and fixed on, for example the unillustrated substrate inside the display housing 11. Accordingly, the first magnet 12 and the second magnet 13 are provided on a plain section of the display housing 11.

In this case, the second magnet 13 may be disposed in the opposite side of the aforementioned position, that is in a right side in FIG. 1.

The first magnet 12 and the second magnet 13 are formed with such as magnet pieces in a thin rectangular solid shape, generating a magnetic field toward a direction vertical to the main face.

That is, one of the main faces in each magnet 12, 13, for example surfaces contacting with the substrate are being the north poles of the magnetic poles, and the other of the main faces, that is, convex upper end surfaces are being the south poles. Then, a magnetic field line passing through each magnet 12, 13 is vertical to both main faces.

Meanwhile, the first Hall IC 22 is disposed at a center in the width direction of the operation housing 21, with being positioned at opposite side to the first magnet 12 such that the first Hall IC 22 and the first magnet 12 are arranged symmetrically with centering the universal hinge 30 in between thereof, and fixed on, for example, an unillustrated substrate inside the operation housing 21.

Therefore, when the display housing 11 is folded, the first Hall IC 22 overlaps with the first magnet 12 provided in the display housing 11 in a plain direction of the display housing 11 and the operation housing 21, so that the first Hall IC 22 and the first magnet 12 can be corresponded to each other.

The second Hall IC 23 is disposed at one side end section in the width direction in between the operation panel 21A of the operation housing 21 and the universal hinge 30, with being positioned at opposite side to the second magnet 13 of the display housing 11 such that second Hall IC 23 and the second magnet 13 are arranged symmetrically with centering the universal hinge 30 in between thereof, and fixed on, for example, an unillustrated substrate inside the operation housing 21.

As described above, the first Hall IC 22 and the second Hall IC 23 are provided in a plain section of the operation housing 21.

For the first and second Hall ICs 22, 23, an IC chip with three terminals composed of such as a Hall element, an operation amplifier, and a comparator is used. When density of magnetic flux is low, a detection signal with a level of a voltage being high (high-level) is generated. When density of the magnetic flux is high, a detection signal with a level of a voltage being low (low-level) is generated.

Magnetism of the first magnet 12, as described, is detected by the first Hall IC 22, so that open/close movement of the display housing 11 and the operation housing 21 is detected. Further, magnetism of the second magnet 13 is detected by the second Hall IC 23 so that rotation movement of the display housing 11 with respect to the operation housing 21 is detected.

That is, in the open state in FIG. 3A, as shown in FIG. 1 with being enlarged, the first magnet 12 and the second magnet 13 are positioned in opposite directions with respect to the first Hall IC 22 and the second Hall IC 23, having the universal hinge 30 in between them. Accordingly, each Hall IC 22 and 23 cannot detect the magnetism of each magnet 12 and 13, which are outside detection ranges.

In such a state, the first Hall IC 22 is set so as to output a detection signal in a high level 41, and the second Hall IC 23 is set so as to output a detection signal in a high level 43.

Operations to be performed in the open state are: a calling operation by an off-hook key, a receiving operation when an incoming call is arrived, a shooting operation by a digital camera, an editing operation for an E-mail, a browsing operation for an incoming E-mail, a searching operation for an electronic telephone book, an browsing operation for a website when an internet is accessed, and the like. Further, when making a call or receiving a call, inputted destination number, originator number, or the like are displayed on the main display. Moreover, when taking a picture, an image to be photographed is displayed on the main display as a finder.

In the closed state in FIG. 3B, as shown in FIG. 4 with being enlarged, the first magnet 12 and the first Hall IC 22, as well as the second magnet 13 and the second Hall IC 23, are overlapped with each other in the plain direction of the display housing 11 and the operation housing 21 respectively. Accordingly, each of the first and the second magnets 12 and 13 are within the magnetic detection ranges of the respective first and second Hall ICs 22 and 23.

In such a state, the first Hall IC 22 is set so as to output a detection signal in a low level 42, and the second Hall IC 23 is set so as to output a detection signal in a low level 44.

Then, from the aforementioned open state, turning the display housing 11 by 180 degrees around the axis C of the universal hinge 30 with respect to the operation housing 21 and closing the display surface 11A with being faced to the outside, the housings are in the reversed display state, as shown in FIG. 3C.

In the reversed display state, as shown in FIG. 5 with being enlarged, the first magnet 12 and the first Hall IC 22 are overlapped with each other in the plain direction of the display housing 11 and the operation housing 21. Accordingly, the magnetism of the first magnet 12 is being within the magnetic detection range of the first Hall IC 22.

In such a state, the first Hall IC 22 is set so as to output a detection signal in the low level 42.

On the other hand, the second magnet 13 and the second Hall IC 23 are apart from each other by a prescribed dimension in the width direction of the display housing 11 and the like while the display housing 11 and the operation housing 21 is overlapped with each other. Accordingly, the second magnet 13 is outside the magnetic detection range of the second Hall IC 23.

In such a state, the second Hall IC 23 is set so as to output a detection signal in the high level 43.

Operations to be performed in the reversed display state are: an calling operation with the side key, an receiving operation when a call is arrived, a call, a photographing operation, a browsing operation when an E-mail arrives, a browsing operation for downloaded information from a website and the like. When the housings are in the reversed display state, switching between a screen display and a voice output by a receiver is performed in accordance with an identification result of each state.

Further, when the display housing 11 in the reversed display state is turned 90 degrees around the axis B, and then a state becomes the 90-degree state, as shown in FIG. 3D.

In the 90-degree state, as shown in FIG. 6 with being enlarged, the display housing 11 and the operation housing 21 are overlapped partially with each other while the first magnet 12 and the first Hall IC 22 are apart from each other by a prescribed dimension in a 90-degree direction. Accordingly, the first magnet 12 is outside the magnetic detection range of the first Hall IC 22.

In such a state, the first Hall IC 22 is to output a detection signal in the high level 41, as well as the case in FIG. 3A.

On the other hand, as for the second magnet 13 and the second Hall IC 23, the display housing 11 and he operation housing 21 are overlapped partially with each other in the plain direction. Accordingly, the second magnet 13 is within the magnetic detection range of the second Hall IC 23.

In such a state, the second Hall IC 23 is set so as to output a detection signal in the low level 44.

As described above, the display housing 11 and the operation housing 21 can be held in any one of the four states such as the open state and the like, and in each state, the first Hall IC 22 and the second Hall IC 23 detect different main faces of the first and the second magnets 12 and 13, namely detect different magnetic poles, respectively.

For example, as shown in FIG. 4, when the display housing 11 and the operation housing 21 is in the closed state, the first Hall IC 22 and the second Hall IC 23 face each south pole of the first magnet 12 and the second magnet 13, and detect those south poles, respectively.

Meanwhile, as shown in FIG. 5, when the display housing 11 and the operation housing 21 are in the reversed display state, the back surface of the display housing 11 faces the operation surface 21A of the operation housing 21, so that the first Hall IC 22 faces the north pole of the first magnet 12 and detects that north pole.

Further, as shown in FIG. 6, when the display housing 11 and the operation housing 21 are in the 90-degree state, the back surface of the display housing 11 faces the operation surface 21A of the operation housing 21. Accordingly, the second Hall IC 23 faces the north pole of the second magnet 13 and detects that north pole.

As described above, as the first Hall IC 22 and the second Hall IC 23 in the first exemplary embodiment, bipolar type Hall ICs capable of detecting both south and north poles are used.

Outputs from the first Hall IC 22 and the second Hall IC 23 as described are inputted into a CPU 35 that is the state determining unit, as shown in FIG. 7.

The CPU 35 recognizes each state shown in FIGS. 3A-3D according to combinations, as shown in FIG. 8, of detection signals outputted from the first Hall IC 22 and the second Hall IC 23. Further, the CPU 35 is housed in the operation housing 21, for example, and fixed. Here, such combinations of detection signals and the four states are set in advance.

For example, when a detection signal in the high level 41 from the first Hall IC 22 and a detection signal in the high level 43 from the second Hall IC 23 are inputted into the CPU 35 respectively, the CPU 35 can recognize the open state according to the combinations in FIG. 8. That is, the state is shown in FIGS. 1 and 3A.

Further, when a detection signal in the low level 42 from the fist Hall IC 22 and a detection signal in the low level 44 from the second Hall IC 23 are inputted into the CPU 35 respectively, the CPU 35 can recognize the closed state according to the combinations in FIG. 8. That is, the state is shown in FIGS. 3B and 4.

Moreover, when a detection signal in the low level 42 from the first Hall IC 22 and a detection signal in the high level 43 from the second Hall IC 23 are inputted into the CPU 35 respectively, the CPU 35 can recognize the reversed display state according to the combinations in FIG. 8. That is, the state is shown in FIGS. 3C and 5.

Furthermore, when a detection signal in the high level 41 from the first Hall IC 22 and a detection signal in the low level 44 from the second Hall IC 23 are inputted into the CPU 35 respectively, the CPU 35 can recognize the 90-degree state according to the combinations in FIG. 8. That is, the state is shown in FIGS. 3D and 6.

As described above, each state is recognized by the CPU 35, and accordingly, operational control is performed suitably in response to each state.

Next, operation of the mobile electronic apparatus 10 according to the present invention described above will be explained.

As shown in FIG. 1, when the display housing 11 and the operation housing 21 are being in the open state, the CPU 35 receives a detection signal in the high level 41 from the first Hall IC 22 and a detection signal in the high level 43 from the second Hall IC 23 respectively. Then, the CPU 35 recognizes it as being in the open state according to the previously set combinations of detection signals and each state, and performs a prescribed process.

As shown in FIG. 4, when the display housing 11 and the operation housing 21 are being in the closed state, the CPU 35 receives detection signals in the low level 42 from the first Hall IC 22 and in the low level 44 from the second Hall IC 23 respectively. Then, the CPU 35 recognizes it as being in the closed state according to the previously set combinations of detection signals and each state, and performs a prescribed process.

As shown in FIG. 5, when the display housing 11 and the operation housing 21 are being in the reversed display state, the CPU 35 receives detection signals in the low level 42 from the first Hall IC 22 and in the high level 43 from the second Hall IC 23 respectively. Then, the CPU 35 recognizes it as being in the reversed display state according to the previously set combinations of detection signals and each state, and performs a prescribed process.

As shown in FIG. 6, when the display housing 11 and the operation housing 21 are being in the 90-degree state, the CPU 35 receives detection signals in the high level 41 from the first Hall IC 22 and in the low level 44 from the second Hall IC 23 respectively. Then, the CPU 35 recognizes it as being in the 90-degree state according to the previously set combinations of output signals and each state, and performs a prescribed process.

The first exemplary embodiment is constructed and functions as described above, and therefore following effects can be obtained.

(1). The display housing 11 and the operation housing 21 are opened and closed by the universal hinge section 30, and in addition, the display housing 11 is rotated around the axis B and the axis C. Such an open/close state and a rotation state are distinguished by the CPU 35. The CPU 35 can determine the open/close state and the rotation state of the display housing 11 and the operation housing 21 according to a detection result of the first Hall IC 22 and a detection signal of the second Hall IC 23 respectively. Thus, by using two magnetism detecting units and two magnets, any one of the four states in the mobile electronic apparatus 10, i.e., the open state, the closed state where the housings are closed, the reversed display state where the housings are closed with the display reversed to face the outside, and the 90-degree state where the display is turned 90 degrees in the reversed display state can be detected, without using a complicated rotation detection circuit.

(2). The first magnet 12 and the first Hall IC 22, as well as the second magnet 13 and the second Hall IC 23, are disposed so as to overlap with each other when the display housing 11 and the operation housing 21 are folded. Thus, the closed state can be detected more certainly. And in addition, the 90-degree state where the display is turned 90 degrees in the reversed display state can be also detected by placing the magnets and the Hall ICs at prescribed positions.

(3). Since the first magnet 12 and the first Hall IC 22 are fixed respectively at about centers in the width direction of the display housing 11 and the operation housing 21, it is easy to confirm positions to be fixed, and an attachment work becomes easy.

(4). The second magnet 13 and the second Hall IC 23, which are in the display housing 11 and the operation housing 21 respectively, are provided near the universal hinge section 30 and close to one ends of the universal hinge 30. Thus, when the display housing 11 is turned 90 degrees in the reversed display state where the display surface 11A of the display housing 11 faces the outside, the 90-degree state can be realized only with a slight turn from a state where the second magnet 13 and the second Hall IC 23 overlap with each other, and operation becomes easy.

(5). The first and the second magnets 12, 13, and the first and the second Hall ICs 22, 23 are provided in the plain sections of the display housing 11 and the operation housing 21 respectively. Thus, an attachment work becomes easy.

(6). Since the combinations of the four states of the display housing 11 and the operation housing 21 and detection signals which are outputted from the first and the second Hall ICs 22 and 23 are set in advance, the CPU 35 can distinguish any one of the four states easily according to a combination of received signals.

Next, a second exemplary embodiment of the present invention will be explained with reference to FIGS. 9-14.

In this case, same construction members as in the mobile electronic apparatus 10 of the first exemplary embodiment have same numbers as in the first exemplary embodiment.

A mobile electronic apparatus 50 shown in FIGS. 9-14 is different from the first exemplary embodiment described above in that a display housing 51 of the first housing is provided with three magnets. Other constructions are almost same as in the first exemplary embodiment.

With such a configuration as described above, the mobile electronic apparatus 50 can be used effectively in a case where a magnet cannot be fixed at a center in the width direction of the display housing 11, or failure is occurred when one of the Hall ICs is being a bipolar Hall IC.

As shown in FIG. 9, the mobile electronic apparatus 50 includes: the display housing 51, an operation housing 52 that is the second housing. The display housing 51 includes three magnets, i.e., a first magnet 52, a second magnet 53, and a third magnet 54.

The first magnet 52 and the second magnet 53 are provided at end section, opposite side to the universal hinge 30, of the display housing 51, and at an outside of the display surface 51A, having a prescribed interval in between them on a line along the width direction of the display housing 51. In addition, the first magnet 52 and the second magnet 53 are apart from the universal hinge 30 by almost the same interval as in the case of the first magnet 12 in the first exemplary embodiment.

The third magnet 54 is provided at nearly the same position with the second magnet 13 in the first exemplary embodiment described above, and, the third magnet 54 and the second magnet 53 are disposed on almost the same line along with a longitudinal direction of the display housing 51.

As for poles of the first magnet 52 and the second magnet 53, a convex upper surface of the first magnet 52 is set to be a north pole, and a convex upper surface of the second magnet 53 is set to be a south pole.

On the other hand, the operation housing 61 includes two Hall ICs, i.e., a first Hall IC 62 as the first magnetism detecting unit, and a second Hall IC 63 as the second magnetism detecting unit.

The first Hall IC 62 is provided at a position which is shifted from a center toward one side end in the width direction of the operation housing 61 so as to be corresponding to the first magnet 52 in the display housing 51.

The second Hall IC 63 is disposed at almost the same position with the second Hall IC 23 in the first exemplary embodiment described above so as to be corresponding to the third magnet 54 in the display housing 51.

In this case, each magnet 52, 53, 54, and the first and the second Hall ICs 62, 63 may be disposed at those positions the other way around.

As described, the first Hall IC 62 detects magnetism of the first magnet 52, so that open/close movement of the display housing 51 and the operation housing 61 is detected. Further, the second Hall IC 63 detects magnetism of the third magnet 54, so that rotation movement of the display housing 51 with respect to the operation housing 61 is detected.

That is, in the open state shown in FIG. 9, the first magnet 52, the second magnet 53, and the third magnet 54 are provided at the positions which are in the opposite direction with respect to the first Hall IC 62 and the second Hall IC 63, having the universal hinge 30 in between them. Therefore, each Hall IC 62 and 63 cannot detect each magnet 52, 53, and 54 because those are out of detection ranges.

In such a state, the first Hall IC 62 is set so as to output a detection signal in a high level 45, and the second Hall IC 63 is set so as to output a signal in the high level 43.

In the closed state in FIG. 10, the first magnet 52 and the first Hall IC 62, as well as the third magnet 54 and the second Hall IC 63, are overlapped with each other in the plain direction of the display housing 51 and the operation housing 61. Therefore, the first magnet 52 and the third magnet 54 are in the magnetic detection ranges of each Hall IC 62 and 63.

In such a state, the first Hall IC 62 is set so as to output a detection signal in a low level 46, and the second Hall IC 63 is set so as to output a detection signal in the low level 44.

In the reversed display state in FIG. 11, the second magnet 53 and the first Hall IC 62 are overlapped with each other in the plain direction of the display housing 51 and the operation housing 61. Accordingly, the second magnet 53 is in the magnetic detection range of the first Hall IC 62.

In such a state, the first Hall IC 62 is set so as to output a detection signal in the low level 46.

Meanwhile, as for the first magnet 52, the third magnet 54 and the second Hall IC 63, the display housing 51 and the operation housing 61 are partially contacted with each other, while respective magnets 52 and 54 are apart from the second Hall IC 63. Therefore, the second Hall IC 63 cannot detect the magnetism of the first magnet 52 and the third magnet 54 which are outside the magnetic detection range.

In such a state, the second Hall IC 63 is set to output a detection signal in the high level 43.

In the 90-degree state in FIG. 12, the display housing 51 and the operation housing 61 are partially overlapped with each other in the plain direction, however, the first magnet 52 and the second magnet 53 are apart from the first Hall IC 62 by a prescribed dimension in the 90-degree direction. Therefore, the first Hall IC 62 cannot detect the magnetism of the first magnet 52 and the second magnet 53 which are outside the magnetic detection range.

In such a state, the first Hall IC 62 is set so as to output a detection signal in the high level 45.

On the other hand, as for the third magnet 54 and the second Hall IC 63, the display housing 51 and the operation housing 61 are partially overlapped with each other in the plain direction, so that the second Hall IC 63 can detect the magnetism of the third magnet 54 which is in the detection range.

In such a state, the second Hall IC 63 is set so as to output a signal in the low level 44.

The outputted detection signals from the first Hall IC 62 and the second Hall IC 63, described above, are inputted into a CPU 65 that is the determining unit, as shown in FIG. 13.

Then, the CPU 65 recognizes the four states shown in FIGS. 9-12 according to combinations of detection signals from the first Hall IC 62 and the second Hall IC 63, as shown in FIG. 14.

For example, when a detection signal in the high level 43 from the first Hall IC 62 and a detection signal in the high level 45 from the second Hall IC 63 are inputted into the CPU 65, the CPU 65 recognizes the open state according to the combinations in FIG. 14, that is, the state shown in FIG. 9.

When a detection signal in the low level 44 from the first Hall IC 62 and a detection signal in the low level 46 from the second Hall IC 63 are inputted into the CPU 65, the CPU 65 recognizes the closed state according to the combinations in FIG. 14, that is, the state shown in FIG. 10.

When a detection signal in the high level 43 from the first Hall IC 62 and a detection signal in the low level 46 from the second Hall IC 63 are inputted into the CPU 65, the CPU 65 recognizes the reversed display state according to the combinations in FIG. 14, that is, the state shown in FIG. 11.

When a detection signal in the low level 44 from the first Hall IC 62 and a detection signal in the high level 45 from the second Hall IC 63 are inputted into the CPU 65, the CPU 65 recognizes the 90-degree state according to the combinations in FIG. 14, that is, the state shown in FIG. 12.

Accordingly, the CPU 65 recognizes each state, and operational control is performed suitably in response to each state.

As described, the first magnet 52 is set such that the north pole thereof is to be detected in the closed state, the second magnet 53 is set such that the south pole thereof is to be detected in the closed state, and the state of the display housing 51 and the operation housing 61 is changed into four states, therefore poles to be detected is also changed. That is, in the closed state shown in FIG. 10, the first Hall IC 62 detects the north pole of the first magnet 52. Meanwhile, in the state where the housings are closed with the display reversed to face the outside shown in FIG. 11, because the first Hall IC 62 faces the north pole which is opposite side of the south pole of the second magnet 53, that north pole is detected.

Consequently, the first Hall IC 62 detects only the north poles, so that a monopolar detection Hall IC can be used for the first Hall IC 62.

Next, operation of the second exemplary embodiment will be explained.

As shown in FIG. 9, when the display housing 51 and the operation housing 61 are set in the open state, the CPU 65 receives a detection signal in the high level 43 from the first Hall IC 62 and a detection signal in the high level 45 from the second Hall IC 63 respectively. Then, the CPU 65 recognizes it as being in the open state according to the previously set combinations of detection signals and each state, and performs a prescribed process.

As shown in FIG. 10, when the display housing 51 and the operation housing 61 are in the closed state, the CPU 65 receives detection signals in the low level 42 from the first Hall IC 62 and in the low level 44 from the second Hall IC 63 respectively. Then, the CPU 65 recognizes it as being in the closed state according to the previously set combinations of detection signals and each state, and performs a prescribed process.

As shown in FIG. 11, when the display housing 51 and the operation housing 61 are in the reversed display state, the CPU 65 receives a detection signal in the low level 42 from the first Hall IC 62 and a detection signal in the high level 43 from the second Hall IC 63 respectively. Then, the CPU 65 recognizes it as being in the reversed display state according to the previously set combinations of detection signals and each state, and performs a prescribed process.

As shown in FIG. 12, when the display housing 51 and the operation housing 61 are in the 90-degree state, the CPU 65 receives a signal in the high level 41 from the first Hall IC 62 and a signal in the low level 44 from the second Hall IC 63 respectively. Then, the CPU 65 recognized it as being in the 90-degree state according to the previously set combinations of output signals and each state, and performs a prescribed process.

According to the second exemplary embodiment described above, almost the same effect as in the case of (2)-(6) in the first exemplary embodiment can be obtained, and in addition, the following effects can be also obtained. (7). The display housing 51 and the operation housing 61 are opened and closed via the universal hinge 30, and in addition, the display housing 51 is rotated around the axis B and the axis C, and then such an open/close state and a rotation state can be distinguished by the CPU 65. The CPU 65 can distinguish the open/close state and the rotation state of the display housing 51 and the operation housing 61 respectively according to a detection result of the first Hall IC 62 and a detection result of the second Hall IC 63. Therefore, by using two Hall ICs 62, 63 and three magnets 52, 53, 54, any one of the four states of the mobile electronic apparatus 50, i.e., the open state, the closed state where the housings are closed, the reversed display state where the housings are closed with the display reversed to face the outside, and the 90-degree state where the display is turned 90 degrees in the reversed display state, can be detected without using a complicated rotation detection circuit.

(8). The first magnet 52 is set such that the north pole thereof is to be detected in the closed state, and the second magnet 53 is set such that the south pole thereof is to be detected in the closed state, so that the first Hall IC 62 detects the north pole of the first magnet 52 in the closed state. In the reversed display state, the first Hall IC 62 faces the north pole which is opposite side to the south pole of the second magnet 53, so that the first Hall IC 62 detects that north pole. Consequently, the type of the pole detected by the first Hall IC 62 is limited to only the north poles of the magnets, and a monopolar detection Hall IC can be used for the first Hall IC 62. Thus, a cost can be reduced comparing to a case with using the bipolar detection Hall IC.

The present invention is not limited to the aforementioned exemplary embodiments. The present invention includes any transformation and any modification that can achieve an object of the present invention.

For example, in the first exemplary embodiment, the display housing 11 includes the first magnet 12 and the second magnet 13, and the operation housing 12 includes the first Hall IC 22 and the second Hall IC 23. However, the present invention is not limited to this. The display housing 11 may include the first Hall IC 22 and the second Hall IC 23, and the operation housing 12 may include the first magnet 12 and the second magnet 13. In this case, the second magnet 13 and the second Hall IC 23 may be disposed at a symmetric position in the opposite side in the width direction of the display housing 11 and the operation housing 12.

Further, in the second exemplary embodiment, the display housing 51 includes the first magnet 52, the second magnet 53, and the third magnet 54, and the operation housing 62 includes the first Hall IC 62 and the second Hall IC 63. However, the present invention is not limited to this. The display housing 51 may include the first Hall IC 62 and the second Hall IC 63, and the operation housing 62 may include the first magnet 52, the second magnet 53, and the third magnet 54. In this case, the first magnet 52, the second magnet 53, the third magnet 54, and the first Hall IC 62, the second Hall IC 63 may be disposed in the other way around with respect to the above arrangement.

Industrial Applicability

The present invention is usable for the mobile phones and the portable game consoles.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2006-021529, filed on Jan. 30, 2006, the disclosure of which is incorporated herein in its entirety by reference.

BRIEF DESCRIPTION OF THE DRAWINGS

[FIGS. 3A-3D] Diagrams showing each variable setting state of the first exemplary embodiment in FIG. 1, wherein FIG. 3A is an explanatory diagram showing an open state, FIG. 3B is an explanatory diagram showing a closed state, FIG. 3C is an explanatory diagram showing a reversed display state, and FIG. 3D is an explanatory diagram showing a 90-degree state;

[FIG. 8] A table showing combinations of detection signals and states of the first exemplary embodiment in FIG. 1;

[FIG. 14] A table showing combinations of detection signals and states of the second exemplary embodiment disclosed in FIG. 9;

Figure 1:
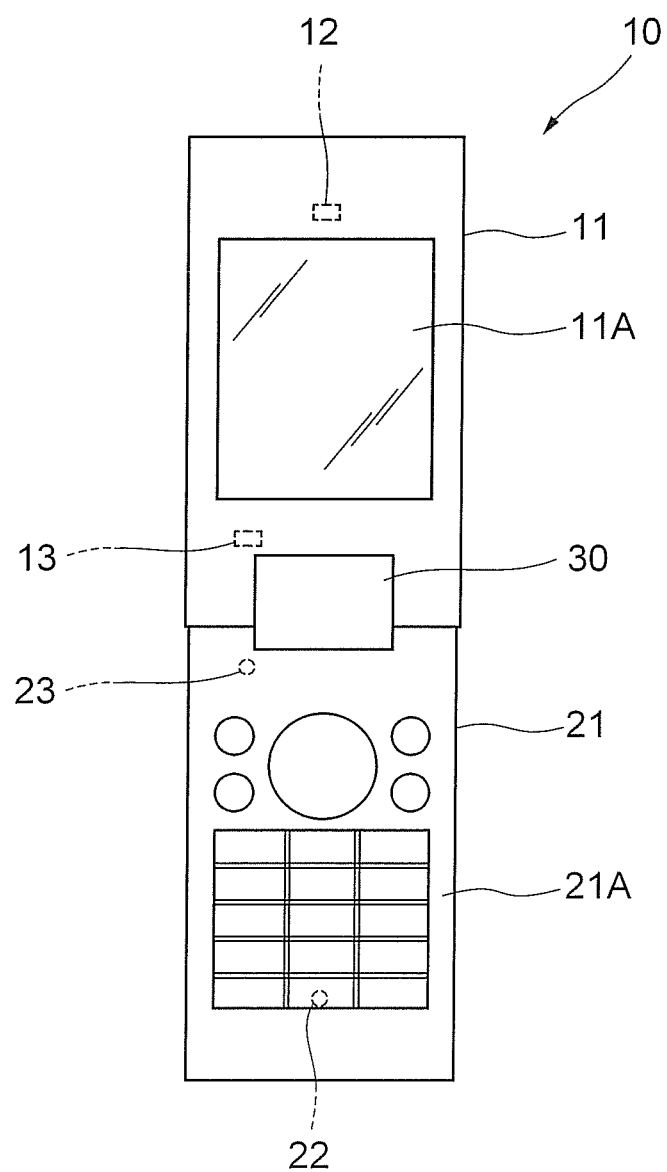
[FIG. 1] An overall front view showing a first exemplary embodiment of the invention in a case of an open state.
Figure 2:
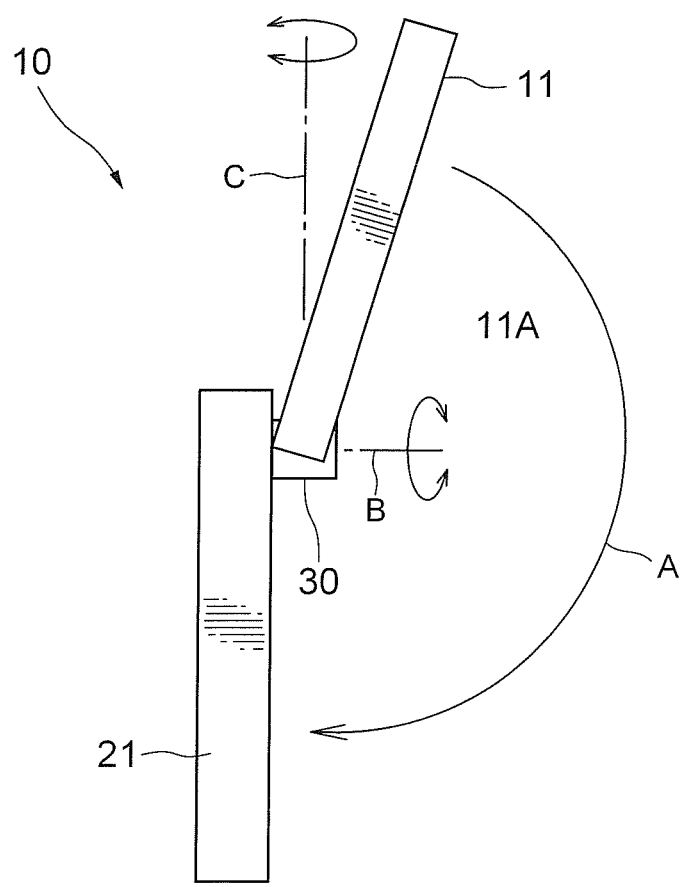
[FIG. 2] An overall side view of the first exemplary embodiment in the FIG. 1.
Figure 3A:
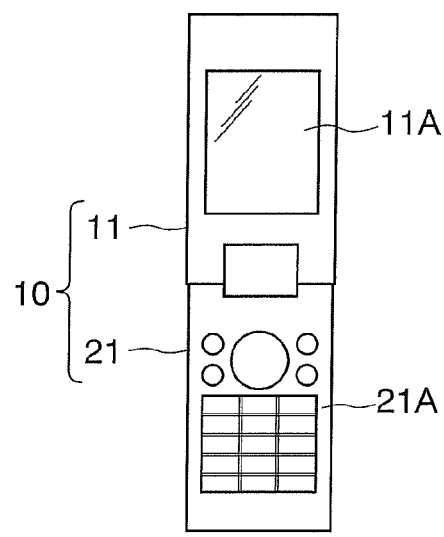
Figure 3B:
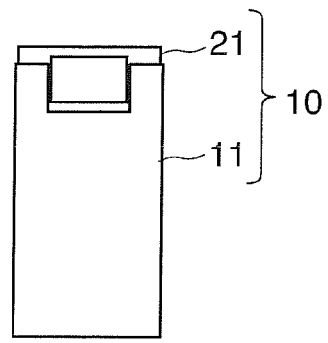
Figure 3C:
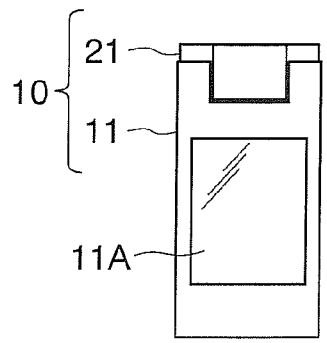
Figure 3D:
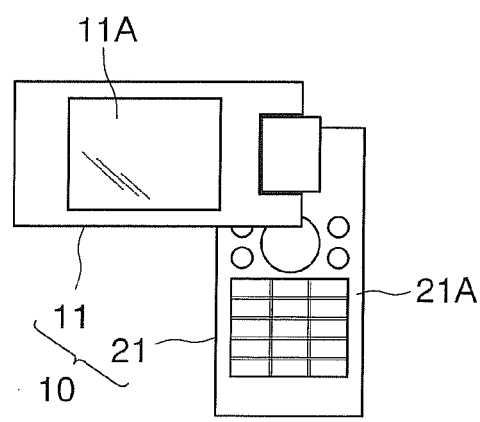
Figure 4:
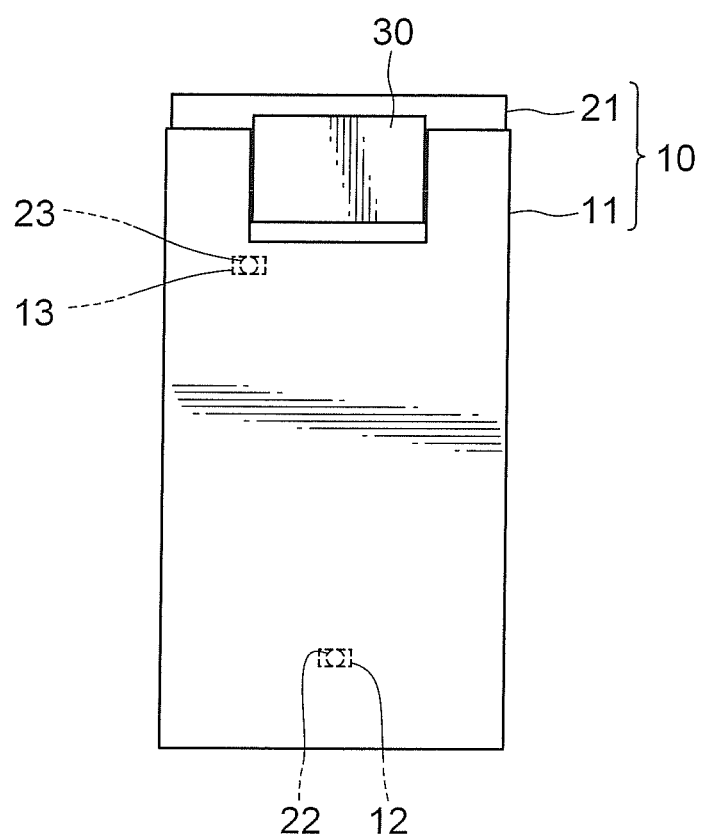
[FIG. 4] A front view showing the closed state of the first exemplary embodiment in FIG. 1.
Figure 5:
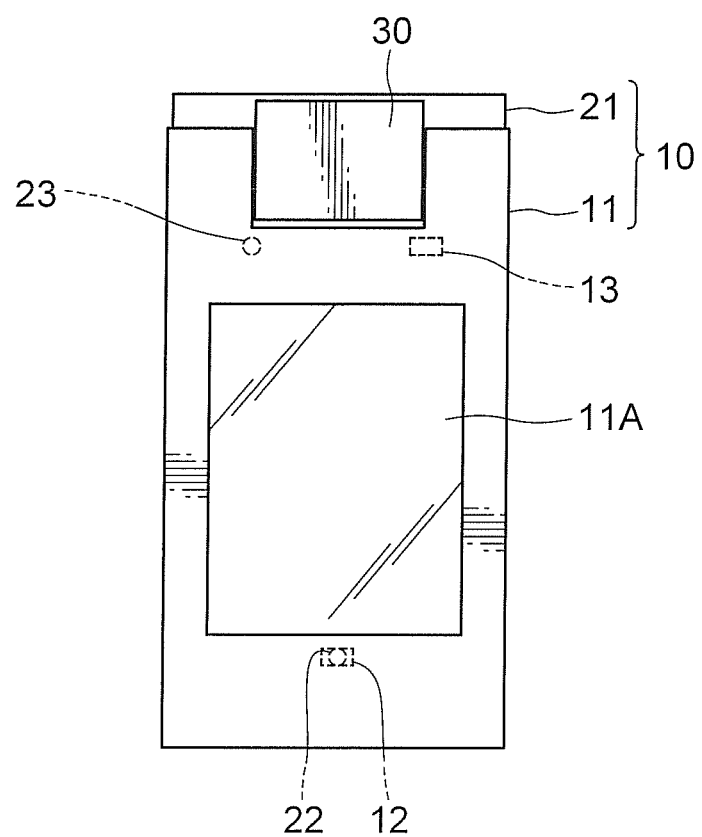
[FIG. 5] A front view showing the reversed display state of the first exemplary embodiment in FIG. 1.
Figure 6:
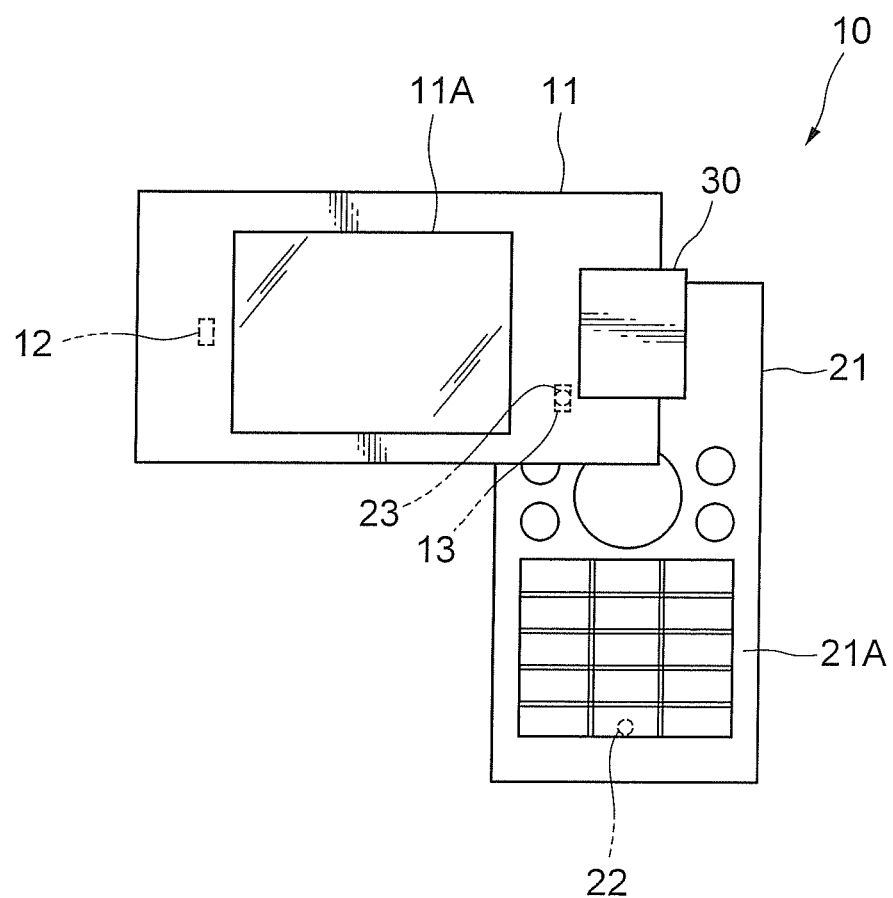
[FIG. 6] A front view showing a state in which a display housing of the mobile electronic apparatus in FIG. 5 is turned 90 degrees.
Figure 7:
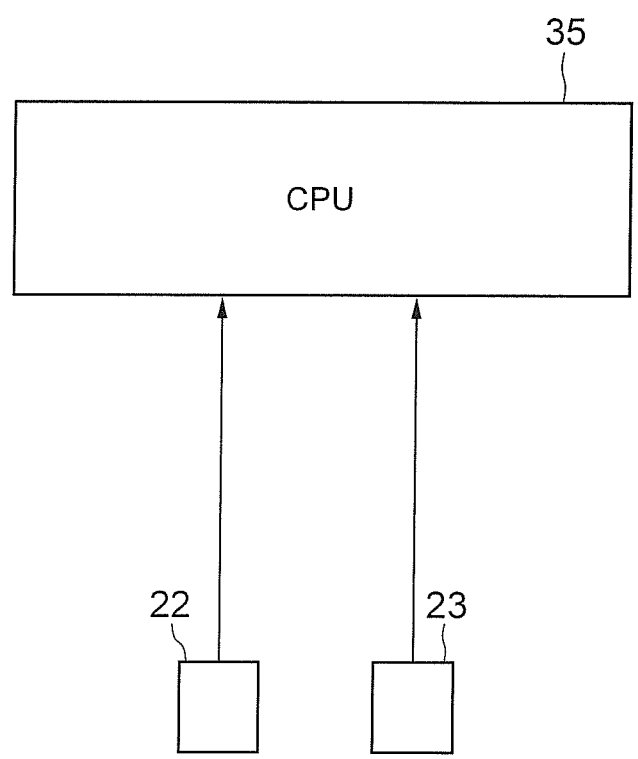
[FIG. 7] A block diagram showing a state determining unit of the first exemplary embodiment in FIG. 1.
Figure 9:
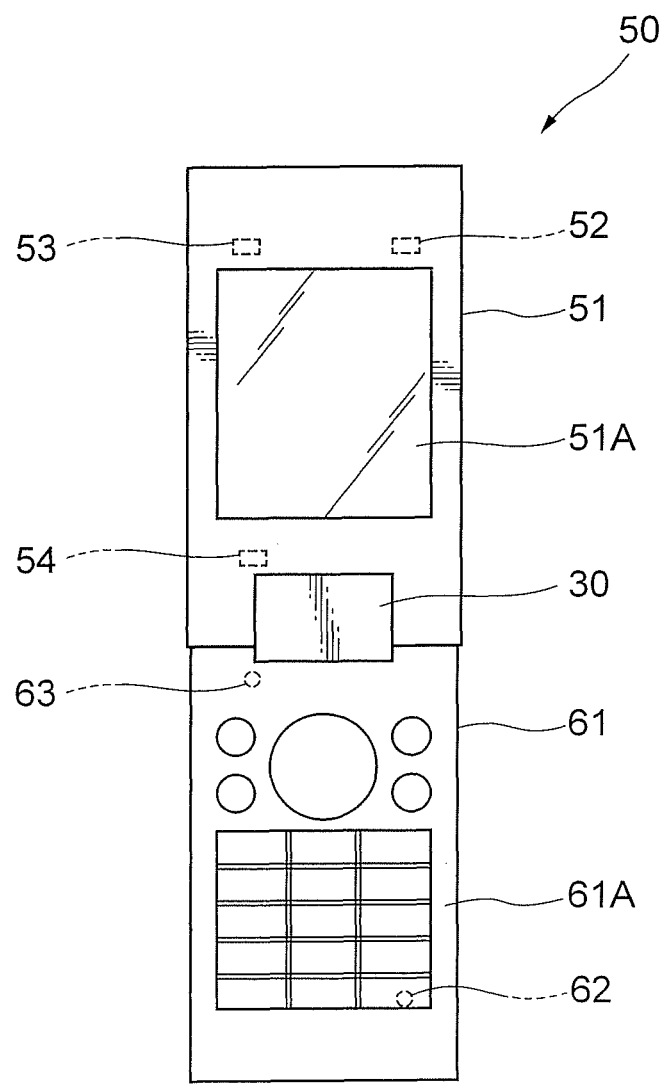
[FIG. 9] An overall front view showing a second exemplary embodiment of the present invention in a case of the open state.
Figure 10:
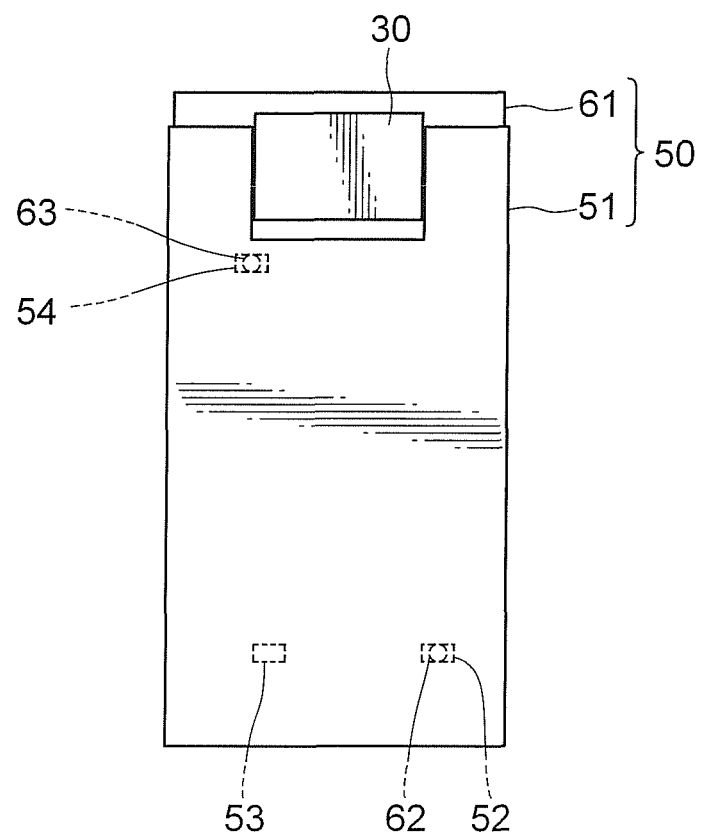
[FIG. 10] A front view showing the closed state of the second exemplary embodiment disclosed in FIG. 9.
Figure 11:
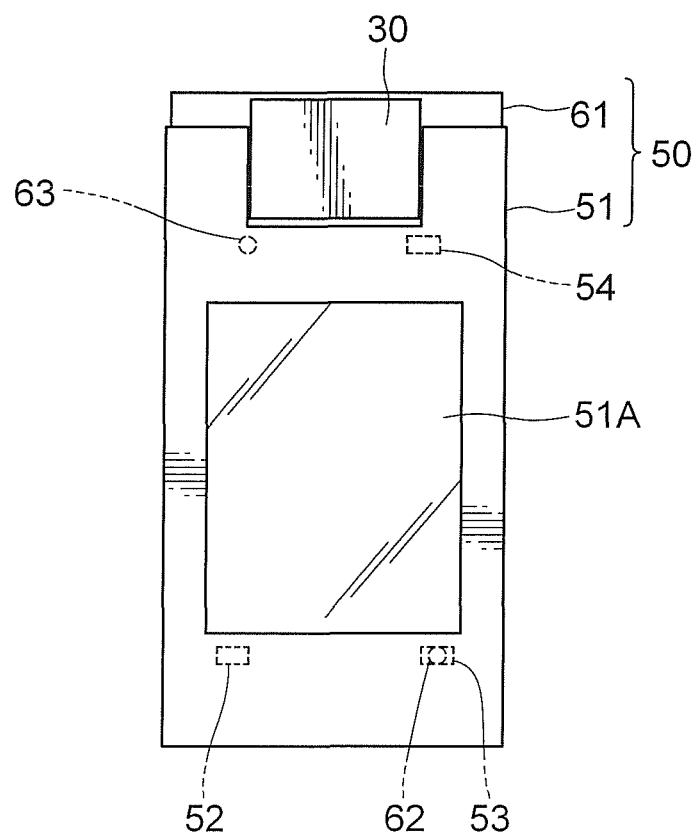
[FIG. 11] A front view showing a reversed display state of the second exemplary embodiment disclosed in FIG. 9.
Figure 12:
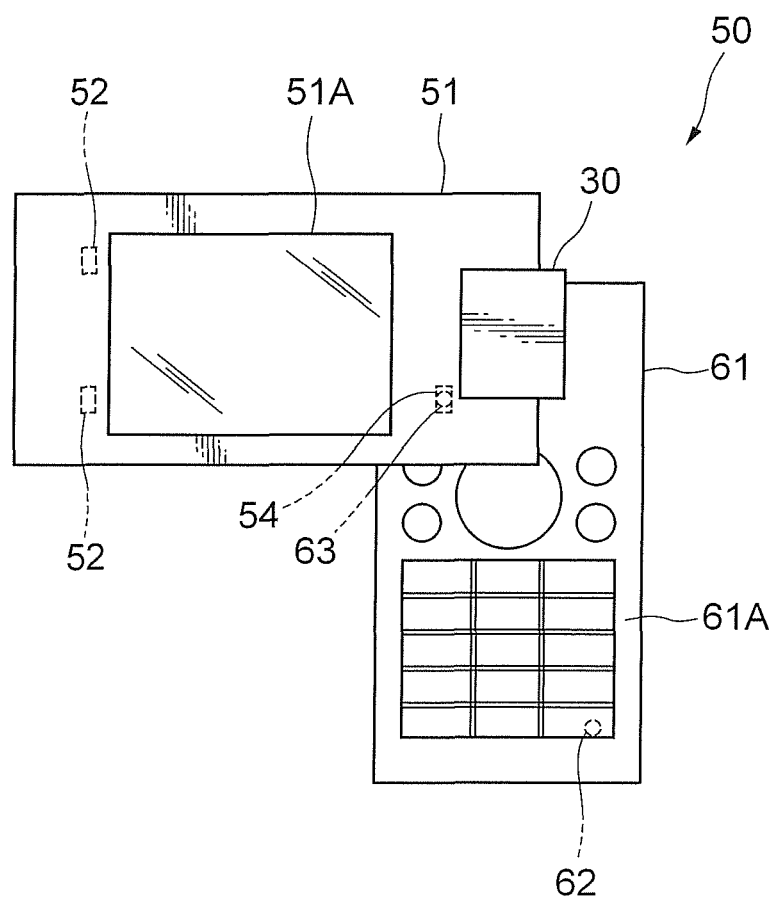
[FIG. 12] A front view showing a state in which a display housing section in the reversed display state of the exemplary embodiment in FIG. 11 is turned 90 degrees.
Figure 13:
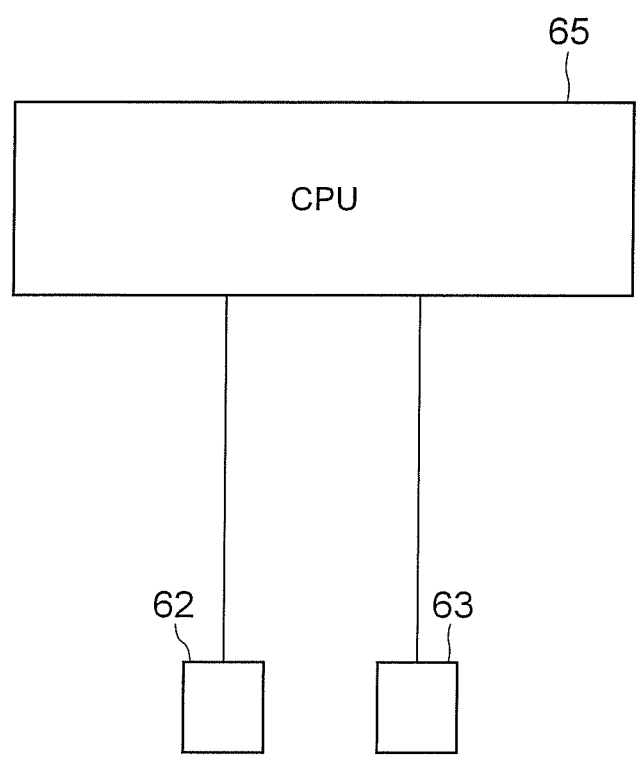
[FIG. 13] A block diagram showing a state determining unit of the second exemplary embodiment disclosed in FIG. 9.
Figure 15:
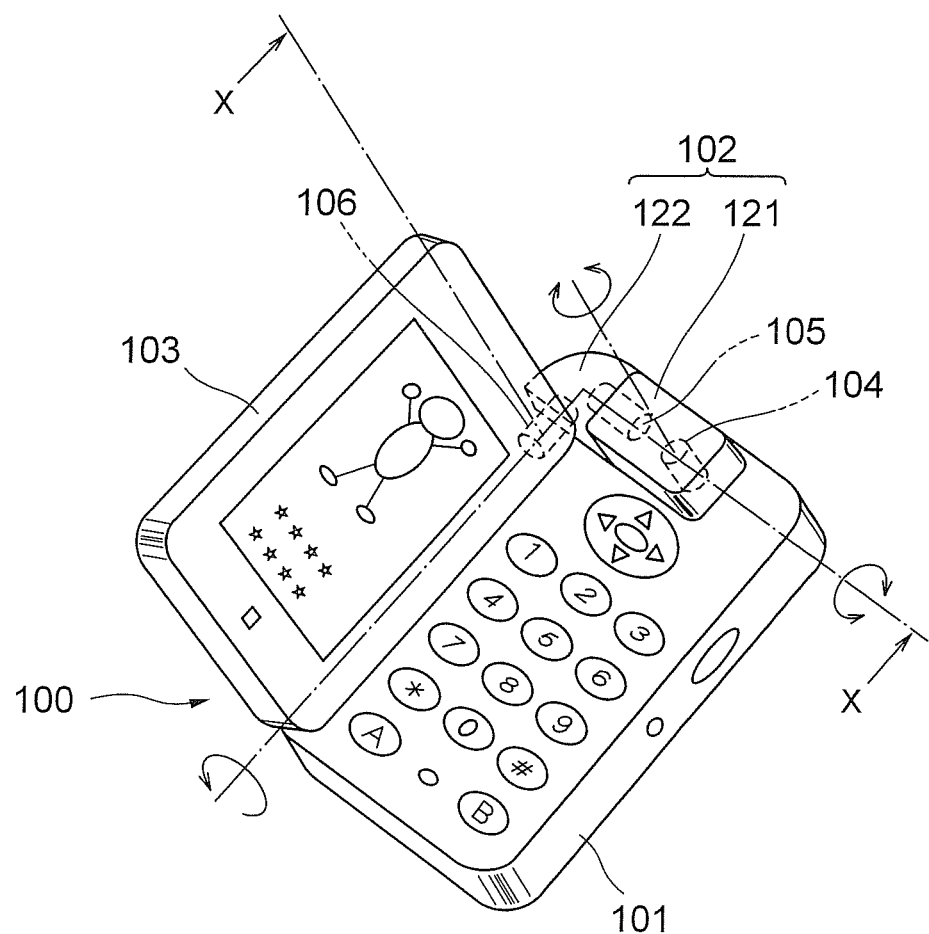
[FIG. 15] An overall perspective view showing a traditional mobile phone.
Figure 16:
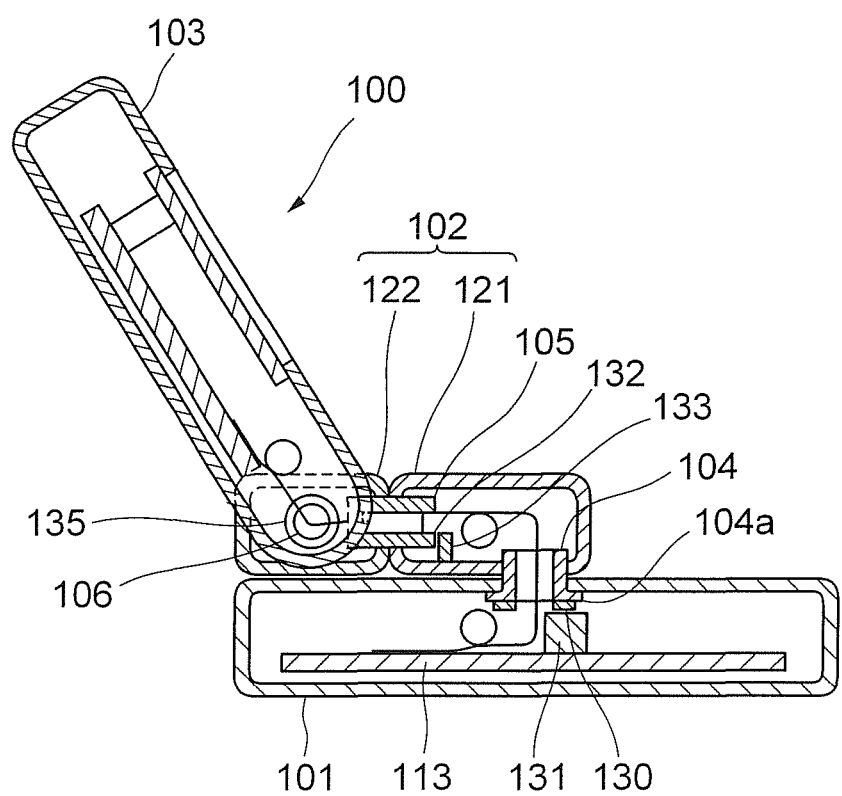
[FIG. 16] A cross-sectional view taken along a line X-X in FIG. 15.
Figure 17:
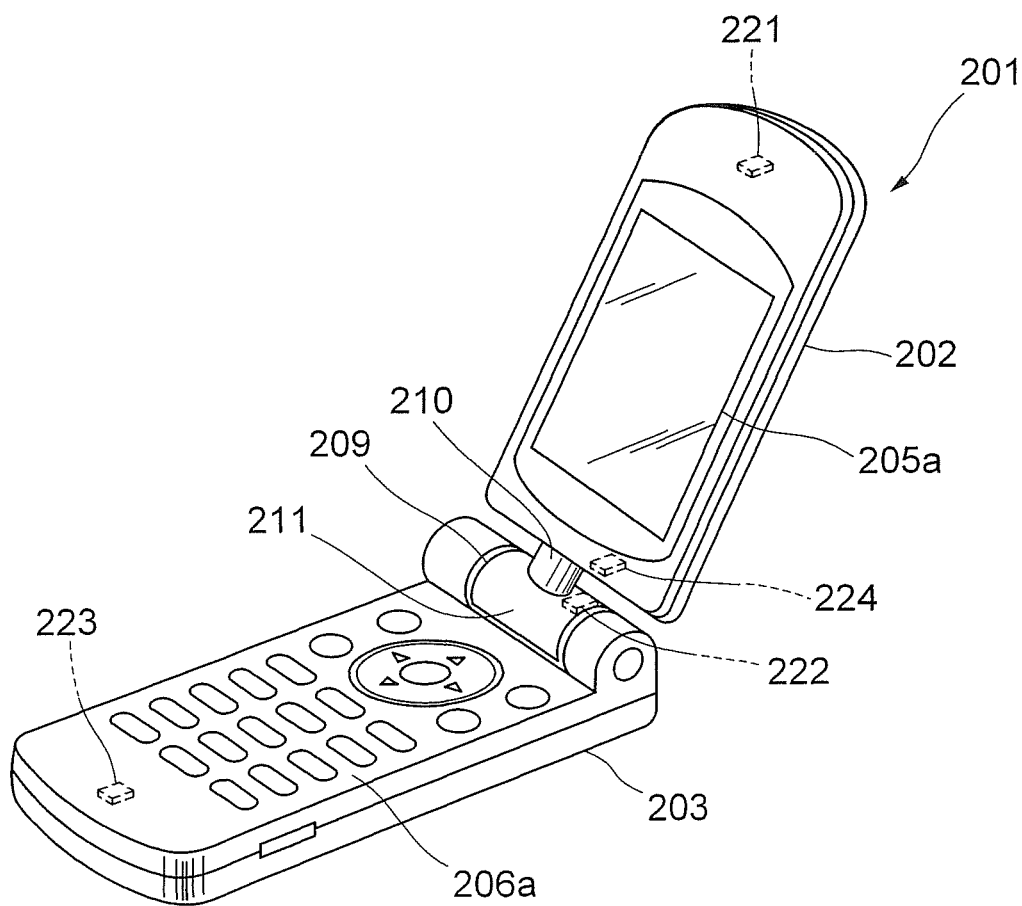
[FIG. 17] An overall perspective view showing another traditional example.

DESCRIPTION OF REFERENCE NUMERALS 10, 50 MOBILE ELECTRONIC APPARATUS
11, 51 DISPLAY HOUSING AS FIRST HOUSING
11A, 51A DISPLAY SURFACE THAT IS DISPLAY SECTION
12, 52 FIRST MAGNET
13, 53 SECOND MAGNET
21 OPERATION HOUSING OF SECOND HOUSING
22, 62 FIRST HALL IC AS FIRST MAGNETISM DETECTING UNIT
23, 63 SECOND HALL IC OF SECOND MAGNETISM DETECTING UNIT
35, 65 CPU AS STATE DETERMINING UNIT
54 THIRD MAGNET

The invention claimed is:

1. A mobile electronic apparatus comprising: a first housing including a display section; and a second housing being a counterpart of the first housing, including an operational panel, the mobile electronic apparatus further comprising:
a universal hinge section for connecting the first housing and the second housing so that the connection of the first housing and the second housing can be switched among an open state, a closed state, a reversed display state in which the display section and the operational panel are reversed to be opened, and a 90-degree state in which the display section and the operational panel are in the reversed display state and turned 90 degrees;

a first magnet, a second magnetic, and a third magnet disposed on the first housing; and a first magnetism detecting unit and a second magnetism detecting unit disposed on the second housing, wherein the first magnet and the second magnet are located above the display section when the first housing and the second housing are in the open stated, the first magnet and the second magnet disposed at positions on a line along a width direction and closer to both ends of the display section;

the third magnet is disposed on the first housing, located below the display section when the first housing and the second housing are in the open state and disposed at a position on a line extended from the second magnet along a longitudinal direction of the first housing with respect to the second magnet;

the second magnetism detecting unit is disposed symmetrically with respect to the third magnet via the universal in-between thereof to be able to detect the third magnet when the first housing and the second housing are in the closed state; and the first magnetism detecting unit is located a line extended form the first magnet along a longitudinal direction of each of the housings when the first housing and the second housing are in the open state to be able to detect the first magnet when the first housing and the second housing are in the closed state.

2. The mobile electronic apparatus as claimed in claim 1, wherein the first magnetism detecting unit and the second magnetism detecting unit detect the state other than the closed state when the first magnetism detecting unit and the second magnetism detecting unit detect only one of the first magnet, the second magnet, and the third magnet or detect none of the magnets.

3. The mobile electronic apparatus as claimed in claim 2, wherein the second magnetism detecting unit detects the reversed display state by detecting the third magnet.

4. The mobile electronic apparatus as claimed in claim 2, wherein the second magnetism detecting unit detects the reversed display state by detecting the second magnet.

5. The mobile electronic apparatus as claimed in claim 1, wherein the first magnetism detecting unit and the second magnetism detecting unit detect the open state when the first magnetism detecting unit and the second magnetism detecting unit detect none of the magnets.

* * * * *